(12) United States Patent
Auvray

(10) Patent No.: US 10,375,624 B2
(45) Date of Patent: Aug. 6, 2019

(54) TECHNIQUE FOR MANAGING AN ACTIVATION STATE OF A RADIO ACCESS MODULE

(71) Applicant: Orange, Paris (FR)

(72) Inventor: Vincent Auvray, Octeville (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 15/316,818

(22) PCT Filed: Jun. 11, 2015

(86) PCT No.: PCT/FR2015/051537
§ 371 (c)(1),
(2) Date: Dec. 6, 2016

(87) PCT Pub. No.: WO2015/193585
PCT Pub. Date: Dec. 23, 2015

(65) Prior Publication Data
US 2017/0156103 A1 Jun. 1, 2017

(30) Foreign Application Priority Data

Jun. 16, 2014 (FR) ...................................... 14 55499

(51) Int. Cl.
*H04W 48/10* (2009.01)
*H04W 48/08* (2009.01)
(Continued)

(52) U.S. Cl.
CPC .......... *H04W 48/10* (2013.01); *H04W 48/08* (2013.01); *H04W 48/16* (2013.01); *H04W 76/11* (2018.02);
(Continued)

(58) Field of Classification Search
CPC ..................................................... H04W 48/10
See application file for complete search history.

(56) References Cited

U.S. PATENT DOCUMENTS 9,723,540 B2 * 8/2017 Brisebois .............. H04W 48/02
2008/0058031 A1 * 3/2008 Deprun ............. H04W 52/0229
455/574

(Continued)

FOREIGN PATENT DOCUMENTS

WO 2014109510 A1 7/2014

OTHER PUBLICATIONS

Written Opinion for the PCT/FR2015/051537 application.

*Primary Examiner* — Michael T Vu
(74) *Attorney, Agent, or Firm* — Haverstock & Owens LLP

(57) ABSTRACT

The invention relates to a technique for managing an activation state of a module for radio access to a main network of a user device (30, 31). The device also includes a module for wireless access to a secondary network, which is activated. The user device looks for a beacon signal of the secondary network when the module for wireless access to the main network is deactivated. The user device detects a beacon signal of the secondary network broadcast by a transmitter device (21) associated with an access point (20) of the main network and, following said detection, activates the module for wireless access to the main network. The user device then connects to the main network via the access point. In a specific embodiment, following the detection of the beacon signal, the user device receives information broadcast on the beacon signal and obtains an identifier of the access point from said broadcast information.

12 Claims, 2 Drawing Sheets

(51) Int. Cl.
  *H04W 48/16* (2009.01)
  *H04W 76/18* (2018.01)
  *H04W 76/11* (2018.01)
  H04W 88/06 (2009.01)
  H04W 4/80 (2018.01)
  H04W 84/12 (2009.01)

(52) U.S. Cl.
  CPC .............. *H04W 76/18* (2018.02); *H04W 4/80* (2018.02); *H04W 84/12* (2013.01); *H04W 88/06* (2013.01)

(56) References Cited

U.S. PATENT DOCUMENTS

| | | |
|---|---|---|
| 2012/0178448 A1 | 7/2012 | Yuk et al. |
| 2013/0005391 A1 | 1/2013 | Niass et al. |
| 2013/0252608 A1 | 9/2013 | Lee et al. |
| 2014/0079022 A1 | 3/2014 | Wang et al. |
| 2014/0308898 A1* | 10/2014 | Lee ................. H04W 76/14 455/41.3 |
| 2014/0370811 A1* | 12/2014 | Kang ................. H04W 84/18 455/41.2 |

* cited by examiner

TECHNIQUE FOR MANAGING AN ACTIVATION STATE OF A RADIO ACCESS MODULE

The invention relates to the general field of telecommunications. The invention relates more particularly to a technique for managing an activation state of a radio access module of a device, this module allowing access to a main network.

The main network is for example a WiFi communication network. This main network is based on WiFi access points, notably using the wireless transmission technology based on the IEEE 802.11 radio network standard and its evolutions commonly grouped under the name WiFi (Wireless Fidelity). A Wifi access point provides access to a wide area communication network, for example the Internet, to devices situated in its radio coverage zone. These devices, once connected to the WiFi access point form, with the access point, a local LAN (Local Area Network) or personal PAN (Personal Area Network) network.

These devices are for example mobile terminals, such as "smartphones" intelligent terminals or tablets. Once connected to an access point, they can thus receive data coming from other devices in the local network or from devices connected to the wide area communication network and can send data to an item of equipment in the local network or connected to the wide area communication network.

The access points correspond for example to access zones (known as "hotspots). These access zones do not generally provide continuous radio coverage.

Thus, when one of these devices is moved, it leaves the coverage zone of the access point and can be outside of access zones. Moreover, the selected access point can also no longer be available, for example for reasons of loading. In these different cases, the device then searches for a new WiFi access point in order to connect itself. This search is carried out repeatedly until a new access point is detected.

This search gives rise to energy consumption of the order of several tenths of watts, which is not negligible for the battery of such a device.

One of the purposes of the invention is to overcome the inadequacies/disadvantages of the prior art and/or to add improvements to it.

According to a first aspect, the invention relates to a method for managing an activation state of a module for radio access to a main network of a user device. This device comprises moreover an activated module for radio access to a secondary network. The method comprises the following steps implemented by this device:

when the module for radio access to the main network is deactivated, searching for a beacon signal of the secondary network;

detection of a beacon signal of the secondary network broadcast by a transmitting device associated with an access point of the main network;

after the detection, activation of the module for radio access to the main network; and, connection to the main network by the intermediary of the access point.

An "activated" activation state is associated with a radio access module in service.

A "deactivated" activation state is associated with a radio access module on standby or switched off.

Thanks to the association of a transmitting device of the secondary network with an access point of the main network, the user device can have its main radio access module deactivated and can reactivate it solely when it receives the beacon signal from a transmitting device of the secondary network. Thus, in geographic areas in which no access to the main network is offered, the energy consumption induced by the search for an access point of the main network is greatly reduced. The main network is a network according to a first access technology, for example of the WiFi type. The secondary network is a low-consumption wireless network according to a second access technology. It is for example a radio access network technology of the BLE (Bluetooth Low Energy). For a secondary network using BLE type, this energy consumption is of the order of a few milliwatts, compared with several tenths of watts for a main radio network search.

Once the main radio access module is activated, the user device can then search for the accessible access points of the main network, more precisely the access point with which the transmitting device of the secondary network is associated. It is thus observed that the search is only initiated when it is guaranteed that the result of this search will be positive. This prevents the user device from searching repeatedly for access points of the main network.

The different ways or features of embodiment mentioned below can be added, independently or in combination with each other, to the steps of the management method such as defined above.

In a particular embodiment, the management method comprises the following steps following the detection of the beacon signal:

receiving information broadcast on the beacon signal;
obtaining an identifier of the access point from said broadcast information.

Once the identifier of the associated access point is obtained, the user device can connect itself more rapidly. In fact, the search for an access point of the main network stops as soon as the identified access point is detected. The energy consumption is again reduced.

In a particular embodiment, the identifier is obtained from a central device by the intermediary of a third radio access network.

This embodiment is particularly suitable for user devices having access to a third network, for example to a 3GPP mobile network. The association of the transmitting device of the secondary network with the access point of the main network can thus be easily updated by the operator of these networks. The deployment of the main and secondary networks is also facilitated: new associations can be created easily.

In a particular embodiment, an association between the information and the identifier is stored locally.

It is thus very simple for the user device to obtain the identifier of the access point of the main network with which the transmitting device of the secondary network is associated.

In a particular embodiment, the broadcast information comprises the identifier.

It is thus very simple for the user device to obtain the identifier of the access point of the main network with which the transmitting device of the secondary network is associated, by reading the broadcast information.

In a particular embodiment, the management method comprises moreover a step of detecting a disconnection of the device from the main network and a step of deactivation of the module for radio access to the main network.

The deactivation of the main radio access module thus makes it possible to reduce the energy demands of the user device.

According to a second aspect, the invention also relates to a user device comprising:
a module for radio access to a main network;
an activated module for radio access to a secondary network, arranged for searching for a beacon signal of the secondary network when the module for radio access to the main network is deactivated, and for detecting a beacon signal of the secondary network broadcast by a transmitting device associated with an access point of the main network;
a control module, arranged for activating the module for radio access to the main network on detection of a beacon signal and for initiating a connection to the main network by the intermediary of the access point.

The advantages described for the management method according to the first aspect are directly transposable to the user device.

In a particular embodiment, the secondary radio access module is moreover arranged for receiving information broadcast on a detected beacon signal and the control module is arranged for obtaining an identifier of the access point from said broadcast information.

According to a third aspect, the invention also relates to a system for access to a main network, comprising at least one access point of the main network, at least one transmitting device of the secondary network associated with said at least one access point and a user device according to the second aspect.

The advantages described for the management method according to the first aspect are directly transposable to the system.

According to a fourth aspect, the invention relates to a program for a user device, comprising program code instructions intended for controlling the execution of the steps of the management method according to the first aspect implemented by the user device, when that program is executed by that device and a recording medium readable by a user device on which a program for a device is recorded.

The advantages described for the management method according to the first aspect are directly transposable to the program for a user device and to the recording medium.

The invention will be better understood with the help of the following description of particular embodiments of the management technique given with reference to the appended drawings in which:

FIG. 1 shows a user device 30 in a first environment.

An access point 20 provides access to a wide area communication network 1, such as the Internet network, to devices situated in a radio coverage zone Z1. This access point 20 comprises a main radio access module according to a first access technology of the Wi-Fi type, according to the IEEE 802.11 standard "Wireless LAN Medium Access Control (MAC) and Physical Layer (PHY) Specifications" (802.11a/b/g/n/ac). The access point 20 thus communicates with devices which are located in its radio coverage zone Z1 by the intermediary of a wireless connection, hereafter called the main wireless connection. By means of this main wireless connection, the devices, when connected, can access the wide area communication network 1 by the intermediary of the access point 20. In a particular embodiment, the access point 20 comprises moreover a secondary radio access module 21. The secondary radio access module is of the low consumption type according to a second access technology, adapted for personal wireless networks, such as Bluetooth®, Zigbee®, Z-Wave®. This kind of low power radio access module makes it possible to provide radio coverage in a zone called WPAN (Wireless Personal Area Network).

A Bluetooth® secondary radio network is based on the specification IEEE 802.15.1 "Wireless Medium Access Control (MAC) and Physical Layer (PHY) Specifications for Wireless Personal Area Networks (WPANs)" and operates in the 2.4 GHz frequency band. There is also a low consumption version of this technology, known by acronym BLE (Bluetooth Low Energy).

A Zigbee® secondary radio network is based on the specification IEEE 802.15.4 ("Low-Rate Wireless Personal Area Network (LR-WPAN) standard") and also operates in the 2.4 GHz frequency band. Zigbee® is notably adapted for providing a device remote control service.

A Z-Wave® secondary radio network is based on products certified by the Z-Wave Alliance and operates in the 868.42 MHz frequency band.

The secondary radio access module 21, called the transmitting device, transmits a beacon signal, also called "Beacon".

In this first environment, the access point 20 of the main network and a transmitting device 21 of the secondary network are colocated. More precisely, in a particular embodiment, the access point 20 comprises a secondary radio access module 21 and thus acts as the transmitting device. In another particular embodiment, the access point 20 and the transmitting device 21 are placed in the same physical transmitting site.

The transmission power of the secondary radio access module 21 is adjusted in order to obtain the same radio coverage zone Z1 as the one provided by the access point 20. It is understood that the radio coverage zones among the types of radio access cannot be strictly identical because of differences related to the propagation of radio waves. However, the minimum requirement is that the radio coverage zone of the secondary access module 21 is included in the radio coverage zone Z1 of the access point 20.

Figure 1:
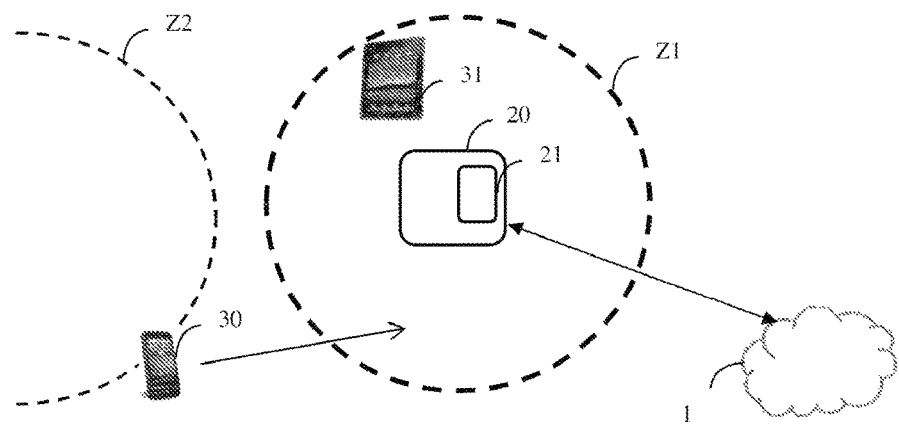
FIG. 1 shows a first environment in which the management technique is implemented.

Another access point, not shown in FIG. 1, provides access to the wide area communication network 1 in a radio coverage zone Z2. This radio coverage zone Z2 does not overlap the radio coverage zone Z1. There is thus a geographic zone in which no access to the main network is possible. This is of course a particular embodiment adapted to the description of the management technique. Other access points can also be available and can have radio coverage zones partially overlapping the radio coverage zone Z1.

Two user devices 30, 31 are shown in FIG. 1. The user device 30 is a mobile terminal and the user device 31 is a touch tablet. These two user devices 30, 31 each have a main radio access module for communicating with the access point 20 or any other access point of the main network. The user devices 30, 31 each also have a secondary radio access module. Their secondary radio access modules are always in an "activated" state of activation, that is to say in service.

The user device 31 is within the radio coverage zone Z1 and is connected to the access point 20. The user device 30, initially connected to the access point of radio coverage zone Z2 moves and leaves that radio coverage zone. It moves toward the radio coverage zone Z1 of the access point 20. This movement is represented by an arrow in FIG. 1.

Only two user devices are shown in FIG. 1. No limitation is applied to the number of user devices or to the types of these devices.

Figure 2:
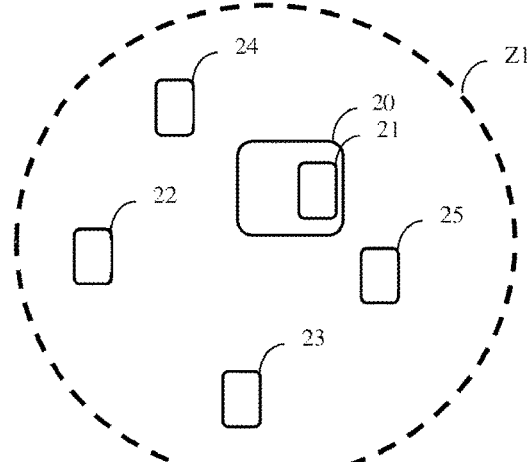
FIG. 2 shows a second environment in which the management technique is implemented.

FIG. 2 shows a second environment in which several transmitting devices 21-25 of the secondary network are associated with the access point 20 of the main network. The transmitting device 21 is colocated with the access point 20. The other transmitting devices 22-25 are distributed in the radio coverage zone Z1 of the access point 20. Several transmitting devices are thus associated with the access point 20 to allow a radio coverage equivalent to that of the radio coverage zone Z1.

It is also possible to deploy transmitting devices in such a way as to ensure a radio coverage by the secondary network over a ring zone centered on the access point. This makes it possible to detect the entrance of the user device into the radio coverage zone of the access point. The number of transmitting devices to be provided is less than that to be provided for the second environment. The deployment of the secondary network is thus less expensive.

For these two environments, the detection of a beacon signal of the secondary network broadcast by a transmitting device 21-25 associated with the access point 20 of the main network makes it possible to command an activation of the main network radio access module. Thus, this main radio access module does not consume energy when the user device is outside of a radio coverage zone of a main network access point. Once the beacon signal of the secondary network is detected, the user device 30 connects itself to the main network by the intermediary of the access point 20. Reciprocally, the detection of a disconnection of the user device 30 from the main network commands a deactivation of the module for radio access to the main network.

It is recalled here that in order to connect itself to the main network, the user device 30 scans all of the channels provided for this first access technology in order to identify the point or points of access to the main network whose radio coverage zone covers the geographic location of the user device and then it selects an access point and transmits an access request.

In a particular embodiment, the beacon signal broadcast by a transmitting device 21-25 of the secondary network notably comprises information making it possible to obtain an identifier of an associated access point of the main network. An identifier of the access point corresponds for example to the SSID (Service Set Identifier) information. This SSID information is an alphanumeric key having a maximum length of 32 characters uniquely identifying an access point. In order to connect itself, the user device 30 stops its search for access points as soon as it has detected the identified access point.

In a first variant, the identifier of the access point is obtained at the request of the user device 30 from a central device by the intermediary of a third radio access network. This third radio access network corresponds for example to a mobile communication network, such as a 3GPP network. The central device stores an association between the broadcast information carried by the beacon signal and the identifier of the access point and thus, in response to the request, provides the identifier of the associated access point. The central device is under the control of the operator of the main and secondary networks. It is thus easier to vary the associations between access points and transmitting devices and to add new associations when new items of equipment are deployed.

In a second variant, the user device 30 locally stores in a memory area an association between the broadcast information and the identifier of the access point. The associations are for example updated when the user device is connected to the main network.

A pairing key can also be stored in association with the broadcast information. In the first variant, the pairing key is provided in response to the request sent by the user device. It can be provided in conjunction with the identifier of the access point or during a second response. In the second variant, the pairing key is obtained in conjunction with the identifier of the access point. The user device 30 is then paired directly with the access point.

In a third variant, the broadcast information comprises the identifier of the associated access point.

By way of illustrative example, the broadcast information comprises a prefix corresponding to an identifier of the operator of the main and secondary networks and a suffix corresponding to the identifier of the associated access point. The user device 30 thus simply obtains the identifier of the access point from the broadcast information.

Again by way of illustrative example, the broadcast information corresponds to the identifier of the associated access point.

Figures 3A, 3B:
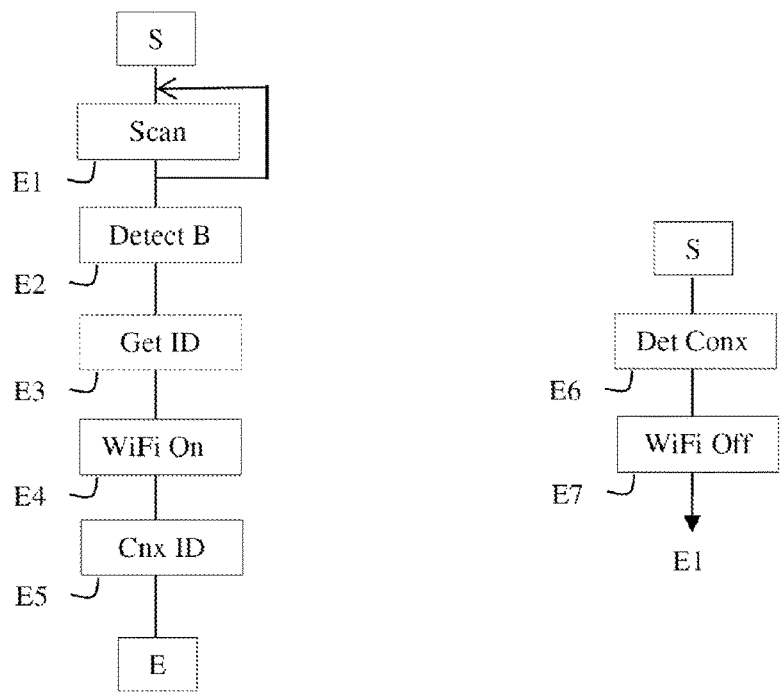
FIGS. 3a-3b show steps of a management method according to particular embodiments.

The technique for managing an activation state of a module for radio access to a main network in particular embodiments, implemented by the user device 30, will now be described with reference to FIGS. 3*a*-3*b*.

In the initial state, the main radio access module is in a "deactivated" activation state, that is to say switched off or on standby. It is recalled that the secondary radio access module is itself always activated.

In a first embodiment, in a step E1, the user device 30 searches for a beacon signal of the secondary network transmitted by one of the transmitting devices 21-25.

In a second step E2, a beacon signal broadcast by a transmitting device 21 is detected.

In a step E4, the user device commands an activation of the main radio access module, that is to bring it into operation. This bringing into operation can correspond to exiting from a standby state or to a switching on of the module. The activation state is then "activated".

In a step E5, the user device 30 searches for an access point of the main network and connects itself to the main network by the intermediary of the access point 20. The connection can be automatic or it can be initiated following a confirmation from the user of the device 30. The user device 30 can then communicate with the other devices connected to the main network or to the wide area communication network 1 by the intermediary of the access point 20.

In a step E6, the user device 30 detects that it is no longer connected to the main network. This disconnection follows for example a movement of the user device outside of the radio coverage zone of the access point 20 or that of access points of the main network, or a degradation of the main wireless connection.

In a step E7, the user device 30 deactivates its main radio access module and returns to the step E1 of searching for a beacon signal of the secondary network.

In a variant, in step E7, the user device 30 again uses the step E1 of searching for the beacon signal of the secondary network and, in the event of failure to detect, then deactivates its main radio access module. This makes it possible to avoid an activation of the main radio access module immediately after a deactivation of the latter.

In a second embodiment, following the detection in step E2 of a beacon signal, the user device 30 receives in a step E3 broadcast information carried by the beacon signal. The user device 30 obtains an identifier of the access point 20 from the broadcast information. It is recalled here that, according to the different variant embodiments described above, the identifier of the access point can be obtained locally by reading a memory zone, on request by interrogation of the central device, or it can be derived directly from the broadcast information.

In step E4, the user device commands an activation of the main radio access module, that is to say a switching on, as described above.

In step E5, the user device 30 searches for the identified access point and connects itself to the main network by the intermediary of the access point 20. In this second embodiment, the connection takes place faster and the energy consumption is further reduced. In fact, as soon as the identified access point is detected, the search stops and the connection is made.

This makes it possible to conserve the battery of the user device 30 without adding complexity in the management of the main radio access module for the user of the device. In fact, the main network is brought into operation when a beacon signal of the secondary network is detected. In one of the particular embodiments, the bringing into operation is automatic and the user does not have to interact with his user device in order to activate/deactivate his main radio access module. In another embodiment, a simple confirmation from him is requested. Moreover, the implementation of the steps of the method is completely transparent to the user. The arrival of the user device in the radio coverage zone of the transmitting device associated with the access point in fact triggers the activation of the main radio access module. A switching off or a putting into standby of the main radio access module can thus be used more frequently, because bringing it again into operation is simpler.

In brief, a secondary radio network is provided in addition to the main radio network. This secondary radio network is constructed in such a way that at least one transmitting device of the secondary network is inside the radio coverage zone of an access point with which it is associated. The secondary radio network is permanently activated and the user device can thus detect the beacon signal when it enters the radio coverage zone of the transmitting device.

The management technique thus makes it possible to deactivate the main radio access module of the user device when it is outside of the radio coverage of the main network. The presence of the secondary radio access module makes it possible to activate the main radio access module as soon as the user device is again within the radio coverage of the main network. The energy consumption of the user device is therefore reduced.

A user device 30 will now be described in a particular embodiment with reference to FIG. 4. Such a user device notably comprises:
- a memory zone 301, arranged for storing a program which comprises code instructions for implementing the steps of the method for managing an activation state, such as described above;
- a storage memory 305, arranged for storing data used during the implementation of the method for managing an activation state:
- a processor 300 for executing code instructions of software modules;
- a main radio access module 302, arranged for sending and receiving data according to a first access technology, notably for communicating on the main network with at least one access point;
- a secondary radio access module 303, separate from the main radio access module, arranged for receiving data according to a second access technology, notably for searching for a beacon signal of the secondary network when the module for radio access to the main network is deactivated, and detecting a beacon signal broadcast by a transmitting device of the secondary network;
- a control module 304, arranged for modifying the activation state of the module from "deactivated" to "activated" on detection of the beacon signal and for initiating a connection to the main network by the intermediary of the access point.

Figure 4:
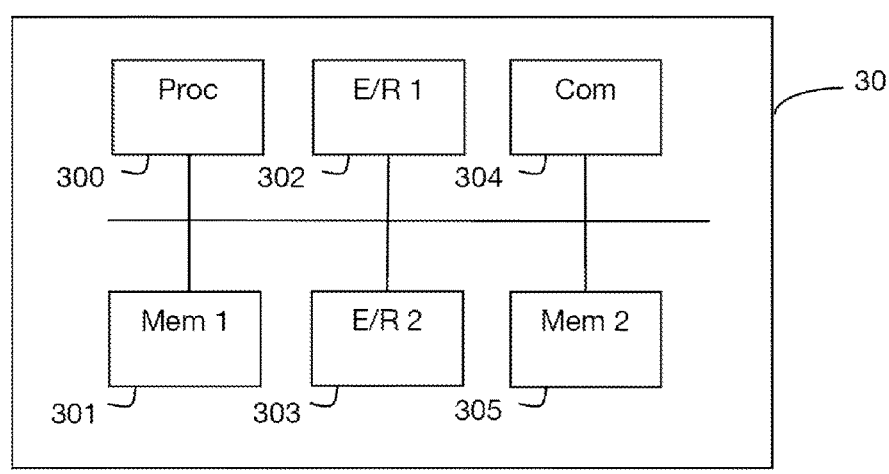
FIG. 4 shows a user device according to a particular embodiment.

It is stressed here that the user device 30 also comprises other processing modules, not shown in FIG. 4, arranged for implementing the various functions of a user device.

In a particular embodiment, the secondary radio access module 303 is moreover arranged for receiving information broadcast on a detected beacon signal and the control module 304 is arranged for obtaining an identifier of the access point from broadcast information carried by the beacon signal.

In a particular embodiment, the control module 304 is moreover arranged for deactivating the main radio access module 302 when the latter no longer receives signals transmitted by main network access points.

In a particular embodiment, the user device 30 is an intelligent terminal ("smartphone") and comprises an operating system. The operating system of the user device is then arranged for waking the control module 304 when the secondary radio access module 303 detects a beacon signal of the secondary network.

The management technique is implemented by means of software and/or hardware components. In this context, the term "module" can equally correspond in this document to a software component or to a hardware component or to an assembly of hardware and/or software components capable of implementing a function or a set of functions as described above for the module in question.

A software component corresponds to one or more computer programs, one or more subroutines of a program or, more generally, to any element of a program or of a software product. Such a software component is stored in memory and then loaded and executed by a data processor of a physical entity and is capable of accessing the hardware resources of that physical entity (memories, recording media, communication bus, electronic input/output cards, user interfaces, etc.).

In the same way, a hardware component corresponds to any element of an assembly of equipment (or hardware). It can be a programmable or non-programmable hardware component, with or without an integrated processor for the execution of software. It is for example an integrated circuit, a smart card, an electronic card for the execution of a small piece of software (firmware), etc.

In a particular embodiment, the module 302, 303, 304 is arranged for implementing the previously described management method. It is preferably a software module comprising software instructions for executing the steps of the previously described management method, implemented by a user device. The invention therefore also relates to:
- a program for a user device, comprising program code instructions intended for controlling the execution of the steps of the previously described management method, when said program is executed by that user device;

a recording medium readable by a user device on which the program for a device is recorded.

The software modules can be stored in or transmitted by a data medium. The latter can be a hardware storage medium, for example a CD-ROM, a magnetic recording means, for example a magnetic diskette or a hard disk. Moreover, the data medium can be a transmission medium such as an electric, optical or radio signal, which can be conveyed via an electric or optical cable, by radio or by other means. The program code instructions can in particular be downloaded from a network of the Internet type.

Alternatively, the data medium can be an integrated circuit in which the program is incorporated, the circuit being adapted for executing or for being used in the execution of the previously described management method.

The invention also relates to a system for access to a main network, comprising at least one access point 20 of the main network, at least one transmitting device 21-25 of the secondary network associated with said at least one access point and a user device such as described above.

The invention claimed is:

1. A method for managing an activation state of a module for radio access to a main network of a user device, said device comprising moreover an activated module for radio access to a secondary network, said method comprising the following acts implemented by said device:
searching for a beacon signal of the secondary network if the module for radio access to the main network is deactivated;
detection of a beacon signal of the secondary network broadcast by a transmitting device associated with an access point of the main network, said detection indicating that said device is in a radio coverage zone of said access point;
receiving information broadcast on the beacon signal of the secondary network;
obtaining an identifier of the access point from said broadcast information;
after the detection, activation of the module for radio access to the main network; and,
connection to the main network by the intermediary of the access point identified by said identifier.

2. The management method as claimed in claim 1, in which the identifier is obtained from a central device by the intermediary of a third radio access network.

3. The management method as claimed in claim 1, in which an association between the information and the identifier is stored locally.

4. The management method as claimed in claim 1, in which the broadcast information comprises the identifier.

5. The management method as claimed in claim 1, comprising moreover a step of detecting a disconnection of the device from the main network and a step of deactivation of the module for radio access to the main network.

6. A user device comprising:
a module for radio access to a main network;
an activated module for radio access to a secondary network, arranged for searching for a beacon signal of the secondary network if the module for radio access to the main network is deactivated, and for detecting a beacon signal of the secondary network broadcast by a transmitting device associated with an access point of the main network, said detecting indicating that said device is in a radio coverage zone of said access point and for receiving information broadcast on the beacon signal of the secondary network; and
a control module, arranged for obtaining an identifier of the access point from said broadcast information, for activating the module for radio access to the main network on detection of a beacon signal and for initiating a connection to the main network by the intermediary of the access point identified by said identifier.

7. A system for access to a main network, comprising at least one access point of the main network, at least one transmitting device of the secondary network associated with said at least one access point and a user device comprising:
a module for radio access to a main network;
an activated module for radio access to a secondary network, arranged for searching for a beacon signal of the secondary network if the module for radio access to the main network is deactivated, and for detecting a beacon signal of the secondary network broadcast by a transmitting device associated with an access point of the main network, said detecting indicating that said device is in a radio coverage zone of said access point and for receiving information broadcast on the beacon signal of the secondary network; and
a control module, arranged for obtaining an identifier of the access point from said broadcast information, for activating the module for radio access to the main network on detection of a beacon signal and for initiating a connection to the main network by the intermediary of the access point identified by said identifier.

8. A non-transitory recording medium readable by a user device on which a program for a user device is recorded, comprising program code instructions intended for controlling execution of steps of a management method, implemented by the device, for managing an activation state of a module for radio access to a main network of the user device, said device comprising moreover an activated module for radio access to a secondary network, when said program is executed by said device, the management method comprising:
searching for a beacon signal of the secondary network if the module for radio access to the main network is deactivated;
detection of a beacon signal of the secondary network broadcast by a transmitting device associated with an access point of the main network, said detection indicating that said device is in a radio coverage zone of said access point;
receiving information broadcast on the beacon signal of the secondary network;
obtaining an identifier of the access point from said broadcast information;
after the detection, activation of the module for radio access to the main network; and,
connection to the main network by the intermediary of the access point identified by said identifier.

9. The recording medium as claimed in claim 8, in which the identifier is obtained from a central device by the intermediary of a third radio access network.

10. The recording medium as claimed in claim 8, in which an association between the information and the identifier is stored locally.

11. The recording medium as claimed in claim 8, in which the broadcast information comprises the identifier.

12. The recording medium as claimed in claim 8, wherein the management method further comprises a step of detecting a disconnection of the device from the main network and a step of deactivation of the module for radio access to the main network.

\* \* \* \* \*